United States Patent
Kalkunte et al.

(10) Patent No.: US 6,744,776 B1
(45) Date of Patent: Jun. 1, 2004

(54) SERVICING PRIORITY TRAFFIC IN MULTIPORT NETWORK SWITCH

(75) Inventors: Mohan V. Kalkunte, Sunnyvale, CA (US); Shashank Merchant, Sunnyvale, CA (US); Phil Simons, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 729 days.

(21) Appl. No.: 09/690,890

(22) Filed: Oct. 18, 2000

Related U.S. Application Data

(60) Provisional application No. 60/178,705, filed on Jan. 28, 2000.

(51) Int. Cl.⁷ .................. H04L 12/56; H04L 12/28
(52) U.S. Cl. ............. 370/412; 370/395.42; 370/395.41
(58) Field of Search ............. 370/395.41, 395.42, 370/412, 465, 396, 401, 413, 415, 417, 422, 428, 429, 468, 469, 395.4, 395.71, 395.72, 419

(56) References Cited

U.S. PATENT DOCUMENTS

| | | | | |
|---|---|---|---|---|
| 6,014,367 A | * | 1/2000 | Joffe | 370/230 |
| 6,169,748 B1 | * | 1/2001 | Barbas et al. | 370/468 |
| 6,256,315 B1 | * | 7/2001 | Barbas et al. | 370/412 |
| 6,259,699 B1 | * | 7/2001 | Opalka et al. | 370/398 |
| 6,335,938 B1 | * | 1/2002 | Chiang et al. | 370/458 |
| 6,336,156 B1 | * | 1/2002 | Chiang | 710/45 |
| 6,345,371 B1 | * | 2/2002 | Lam | 714/719 |
| 6,389,019 B1 | * | 5/2002 | Fan et al. | 370/395.42 |
| 6,393,028 B1 | * | 5/2002 | Leung | 370/412 |
| 6,401,147 B1 | * | 6/2002 | Sang et al. | 710/56 |
| 6,405,258 B1 | * | 6/2002 | Erimli et al. | 709/235 |
| 6,442,135 B1 | * | 8/2002 | Ofek | 370/229 |
| 6,442,137 B1 | * | 8/2002 | Yu et al. | 370/232 |
| 6,445,709 B1 | * | 9/2002 | Chiang | 370/399 |
| 6,452,933 B1 | * | 9/2002 | Duffield et al. | 370/415 |
| 6,460,088 B1 | * | 10/2002 | Merchant | 370/389 |
| 6,463,032 B1 | * | 10/2002 | Lau et al. | 370/218 |
| 6,463,478 B1 | * | 10/2002 | Lau et al. | 709/236 |
| 6,466,580 B1 | * | 10/2002 | Leung | 370/412 |
| 6,470,016 B1 | * | 10/2002 | Kalkunte et al. | 370/395.41 |
| 6,477,170 B1 | * | 11/2002 | Lu et al. | 370/402 |
| 6,480,490 B1 | * | 11/2002 | Merchant et al. | 470/389 |
| 6,483,844 B1 | * | 11/2002 | Erimli | 370/428 |
| 6,487,199 B1 | * | 11/2002 | Erimli | 370/360 |
| 6,490,280 B1 | * | 12/2002 | Leung | 370/392 |
| 6,501,734 B1 | * | 12/2002 | Yu et al. | 370/236 |
| 6,504,846 B1 | * | 1/2003 | Yu et al. | 370/412 |
| 6,507,564 B1 | * | 1/2003 | Merchant | 370/244 |
| 6,515,963 B1 | * | 2/2003 | Bechtolsheim et al. | 370/229 |
| 6,515,990 B1 | * | 2/2003 | Leung | 370/389 |
| 6,515,993 B1 | * | 2/2003 | Williams et al. | 370/395.53 |
| 6,529,503 B1 | * | 3/2003 | Chiang et al. | 370/363 |
| 6,535,489 B1 | * | 3/2003 | Merchant et al. | 370/244 |
| 6,542,512 B1 | * | 4/2003 | Fischer et al. | 370/412 |
| 6,546,010 B1 | * | 4/2003 | Merchant et al. | 370/389 |
| 6,553,027 B1 | * | 4/2003 | Lam et al. | 370/386 |

(List continued on next page.)

*Primary Examiner*—Wellington Chin
*Assistant Examiner*—Jamal A. Fox

(57) ABSTRACT

A novel method of servicing multiple data queues having different priorities is provided in a network switch. A dequeuing logic circuit services the data queues in a round-robin fashion. Programmable number of data packets is selected from each data queue in each cycle. The dequeuing logic circuit compares the number of data packets selected from a current data queue in a current cycle with the preprogrammed number of data packets set for the current queue, and selects a data packet from the current data queue only if the number of packets selected from the current data queue in the current cycle is less than the preprogrammed number. Selection of a data packet from the current data queue is bypassed, processing a next data queue, if the number of packets selected from the current data queue in the current cycle is not less than the preprogrammed number.

17 Claims, 7 Drawing Sheets

U.S. PATENT DOCUMENTS

| | | | |
|---|---|---|---|
| 6,563,790 B1 * | 5/2003 | Yu et al. | 370/230 |
| 6,563,818 B1 * | 5/2003 | Sang et al. | 370/379 |
| 6,574,231 B1 * | 6/2003 | Leung | 370/412 |
| 6,577,636 B1 * | 6/2003 | Sang et al. | 370/395.7 |
| 6,584,106 B1 * | 6/2003 | Merchant et al. | 370/395.32 |
| 6,597,693 B1 * | 7/2003 | Leung | 370/386 |
| 6,618,390 B1 * | 9/2003 | Erimli et al. | 370/412 |
| 6,625,122 B1 * | 9/2003 | Joffe | 370/230 |
| 6,625,146 B1 * | 9/2003 | Merchant et al. | 370/389 |
| 6,625,157 B2 * | 9/2003 | Niu et al. | 370/395.71 |
| 6,628,610 B1 * | 9/2003 | Waclawsky et al. | 370/229 |
| 6,636,523 B1 * | 10/2003 | Lau et al. | 370/415 |
| 6,658,015 B1 * | 12/2003 | Merchant et al. | 370/422 |
| 2003/0072316 A1 * | 4/2003 | Niu et al. | 370/412 |

* cited by examiner

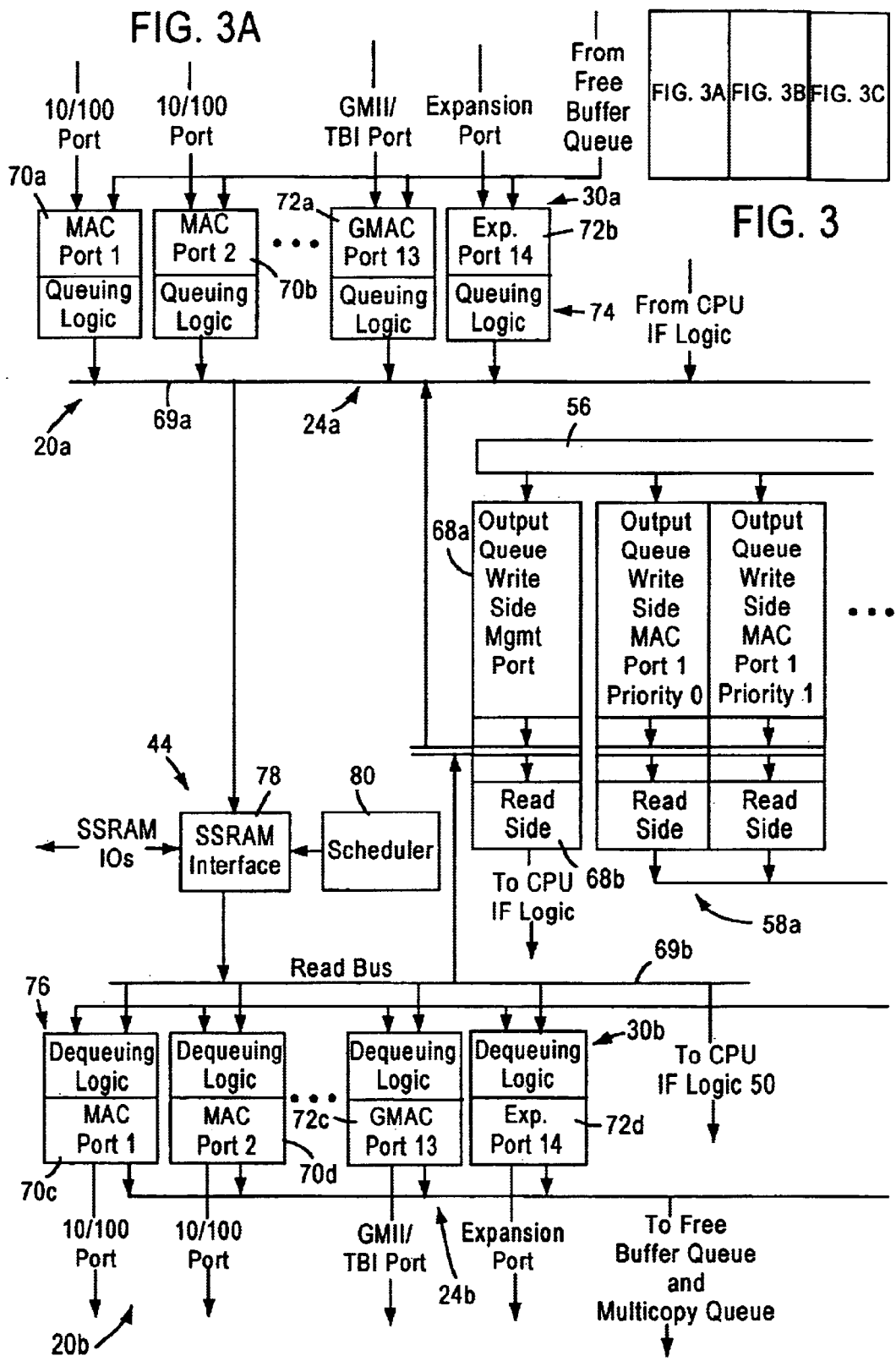

SERVICING PRIORITY TRAFFIC IN MULTIPORT NETWORK SWITCH

This application claims priority of U.S. Provisional Application No. 60/178,705 filed Jan. 28, 2000 entitled SERVICING PRIORITY TRAFFIC IN MULTIPORT NETWORK SWITCH.

FIELD OF THE INVENTION

This invention relates to data communication systems, and more particularly, to a method and system for servicing priority data queues in a multiport network switch.

1. Background Art

A multiport switch may be provided in a data communication network to enable data communication between multiple network stations connected to various ports of the switch. Multiple queues of different priorities may be arranged at each port to service receive and transmit data according to data priority.

Weighted Fair Queuing (WFQ) is the most widely used method of servicing priority traffic in packet switching. This method relies on computing the finish times of all packets in all non-empty queues and servicing those packets whose finish times are first. As WFQ requires time stamping each packet, this method is difficult to implement in a network switch, where each packet needs to be time stamped based on its estimated finish time calculated in accordance with a fluid model.

Thus, there is a need for a priority traffic servicing scheme that may be easily implemented in a network switch.

2. Disclosure of the Invention

The invention provides a novel method of servicing multiple data queues having different priorities in a multiport network switch. A dequeuing logic circuit provided at each port of the switch services the data queues in a round-robin fashion to provide the transmission of data packets selected from the data queues. Programmable number of data packets is selected from each data queue in each cycle of the servicing procedure.

In accordance with a first aspect of the invention, the dequeuing logic circuit compares the number of data packets selected from a current data queue in a current cycle of the servicing procedure with the preprogrammed number of data packets set for the current queue, and selects a data packet from the current data queue only if the number of packets selected from the current data queue in the current cycle is less than the preprogrammed number. Selection of a data packet from the current data queue is bypassed in favor of processing a next data queue, if the number of packets selected from the current data queue in the current cycle is not less than the preprogrammed number.

Preferably, the preprogrammed number of data packets is higher for a data queue having a higher priority. The total value of preprogrammed numbers of data packets to be selected in each cycle for all data queues is equal to a preprogrammed total number of data packets to be selected in each cycle. The total number of data packets selected in the current cycle is equal to the preprogrammed total number. The current cycle may be reset if the total number of data packets selected in the current cycle is equal to the preprogrammed total number.

In accordance with another aspect of the invention, counters are provided for counting number of bytes selected from each data queue in a preset time interval. Each data queue is assigned with a threshold value that may correspond to bandwidth allocated to the data queue.

The dequeuing circuit may compare the number of bytes selected from the current data queue in a preset time interval with a threshold value assigned to the current data queue. A data packet from the current data queue is selected only if the number of bytes selected from the current data queue in the preset time interval is less than the threshold value assigned to the current data queue.

Various objects and features of the present invention will become more readily apparent to those skilled in the art from the following description of specific embodiments thereof, especially when taken in conjunction with the accompanying drawings.

BEST MODE FOR CARRYING OUT THE INVENTION

Figure 1:
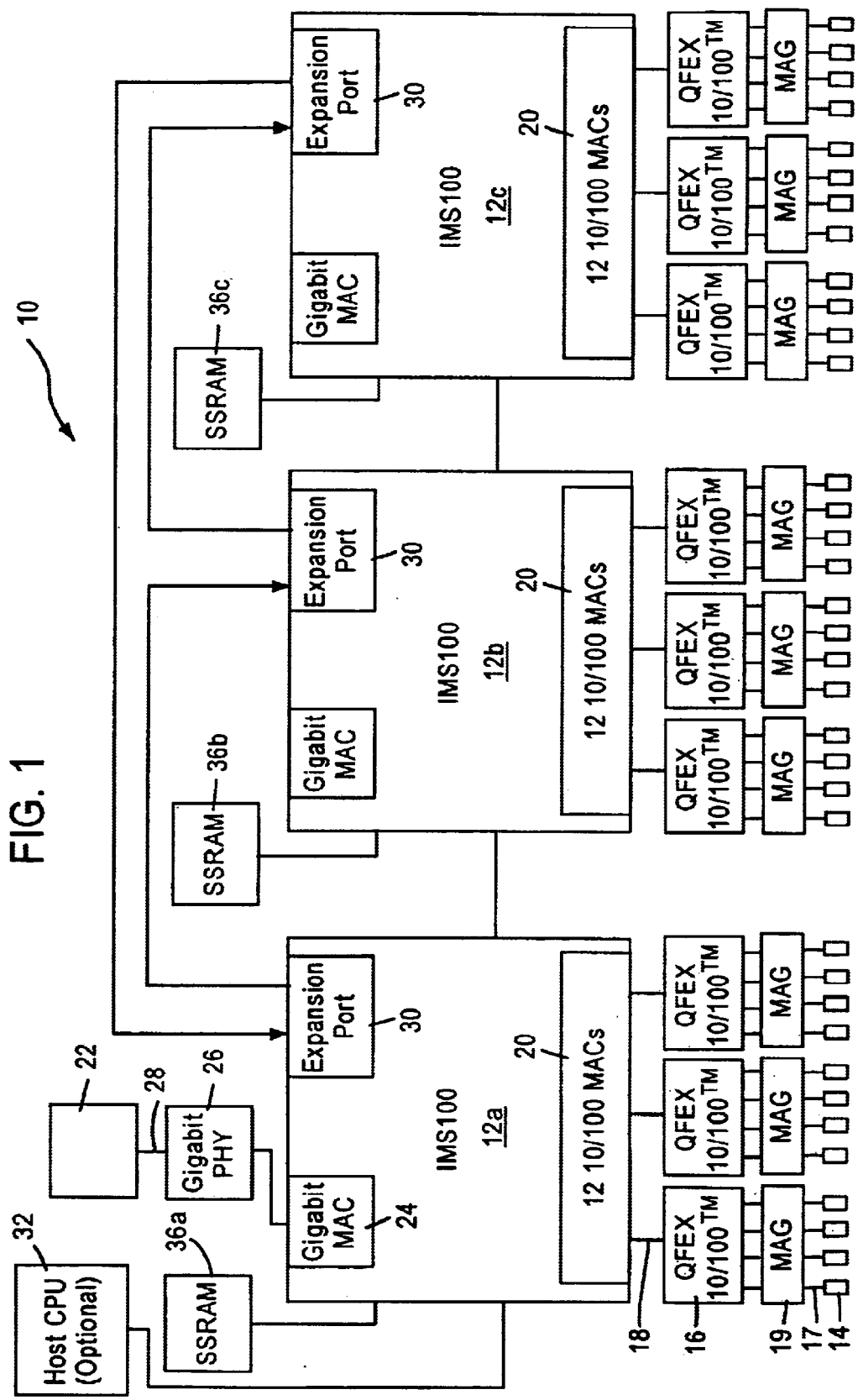
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3(ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
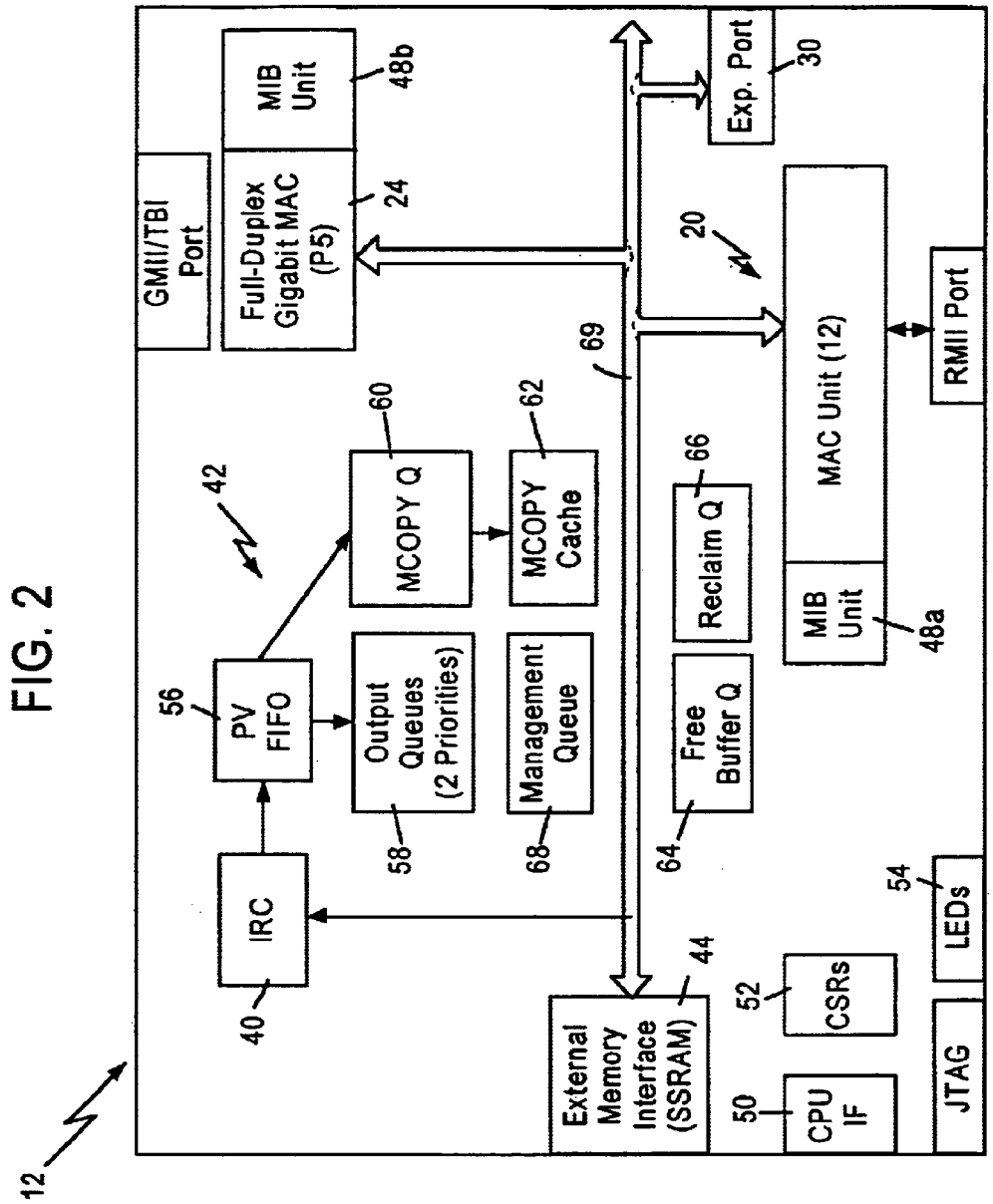
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128 K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figure 3B:
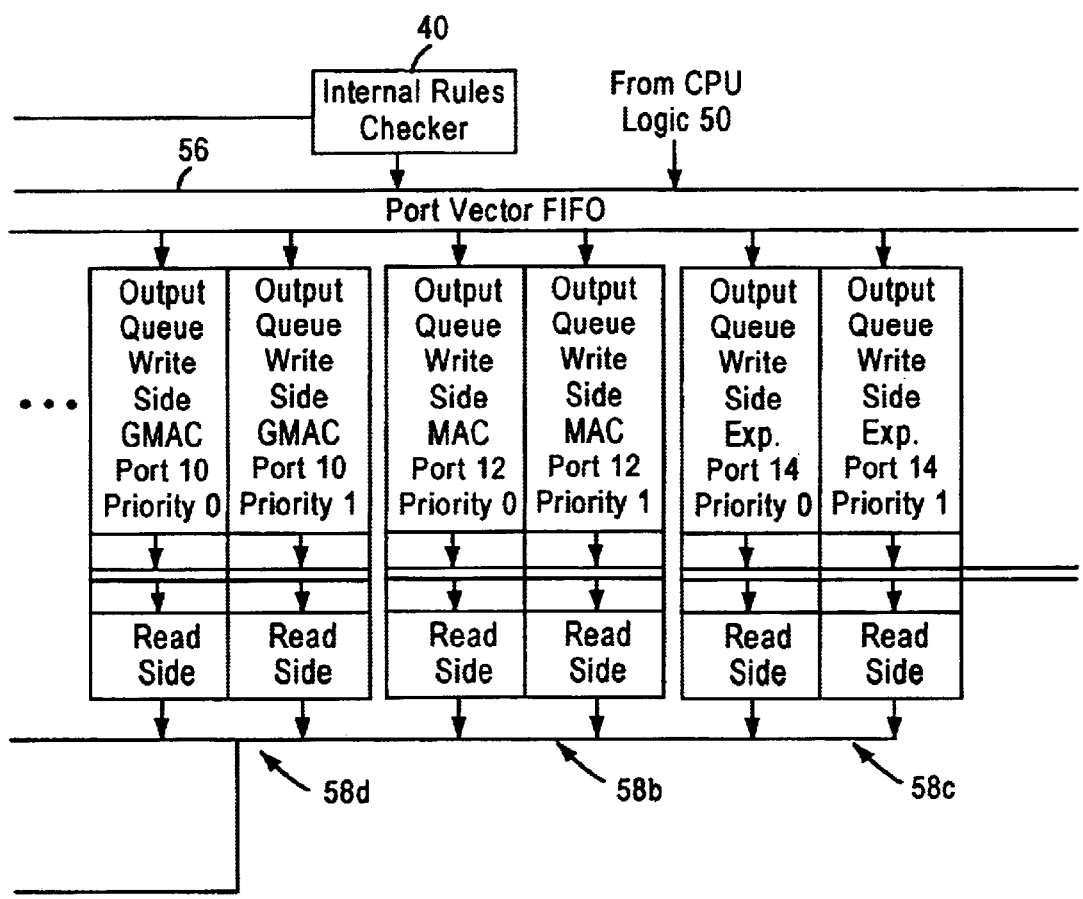
FIG. 3 is a block diagram illustrating in detail the switching subsystem of FIG. 2.
Figure 3C:
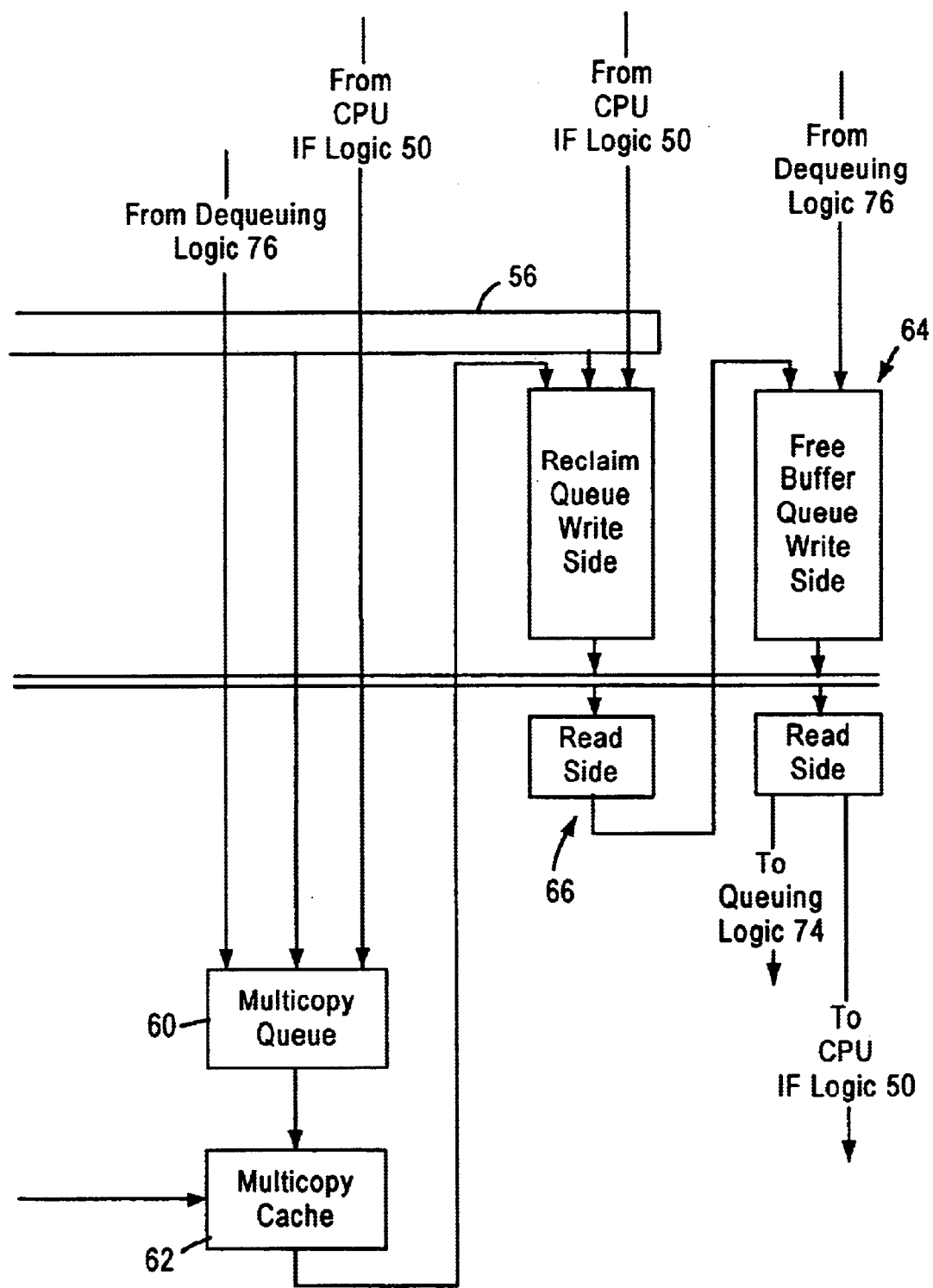

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20*a* and a transmit portion 24*b*. The receive portion 20*a* and the transmit portion 24*b* each include 12 MAC modules (only two of each shown and referenced by numerals 70*a*, 70*b*, 70*c*, and 70*d*) configured for performing the corresponding receive or transmit function according to IEEE 802.3 protocol. The MAC modules 70*c* and 70*d* perform the transmit MAC operations for the 10/100 Mb/s switch ports complementary to modules 70*a* and 70*b*, respectively.

The gigabit MAC port 24 also includes a receive portion 24*a* and a transmit portion 24*b*, while the expansion port 30 similarly includes a receive portion 30*a* and a transmit portion 30*b*. The gigabit MAC port 24 and the expansion port 30 also have receive MAC modules 72*a* and 72*b* optimized for the respective ports. The transmit portions 24*b* and 30*b* of the gigabit MAC port 24 and the expansion port 30*a* also have transmit MAC modules 72*c* and 72*d*, respectively. The MAC modules are configured for full-duplex operation on the corresponding port, and the gigabit MAC modules 72*a* and 72*c* are configured in accordance with the Gigabit Proposed Standard IEEE Draft P802.3z.

Each of the receive MAC modules 70*a*, 70*b*, 72*a*, and 72*b* include queuing logic 74 for transfer of received data from the corresponding internal receive FIFO to the external memory 36 and the rules checker 40. Each of the transmit MAC modules 70*c*, 70*d*, 72*c*, and 72*d* includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69*a* from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69*a*. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70*c*, 70*d*, 72*d*, and 72*c* has an associated output queue 58*a*, 58*b*, 58*c*, and 58*d*, respectively. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

As discussed above, each of the transmit MAC modules 70c, 70d, 72c, and 72d includes a dequeuing logic 76 for transferring data from the external memory 36 to the corresponding internal transmit FIFO. The dequeuing logic 76 services an output queue 58 associated with the corresponding port.

In a preferred embodiment of the invention, the output queue 58 for each output port comprises queues Q1, Q2, Q3 and Q4 having priorities P1, P2, P3 and P4, respectively, where P1>P2>P3>P4. For example, the high priority queue Q1 may be used for frames that require a guaranteed access latency, e.g. frames for multimedia applications or management MAC frames.

A priority traffic servicing scheme of the present invention services the queues Q1, Q2, Q3 and Q4 in accordance with a bandwidth requirement established for each queue. For example, the priority traffic servicing procedure for a particular output port may be performed by the dequeuing logic 76 associated with that port. The dequeuing logic 76 transforms data arranged in the queues Q1, Q2, Q3 and Q4 into a serial data stream forwarded to the internal transmit FIFO of the associated transmit MAC module for transmitting through the associated output port.

In each cycle of traffic servicing, a fixed total number N of packets are selected by the dequeuing logic 76 from the queues Q1, Q2, Q3 and Q4 in a round-robin fashion. The total number N=n1+n2+n3+n4, where n1, n2, n3 and n4 are programmable numbers of packets serviced from Q1, Q2, Q3 and Q4, respectively, in each cycle of the round-robin service procedure. To maintain priorities P1>P2>P3>P4 for the queues Q1, Q2, Q3 and Q4, the number of packets for each queue should be allocated so that n1>n>n3>n4. For example, n1=4, n2=3, n3=2, and n4=1.

Figure 4:
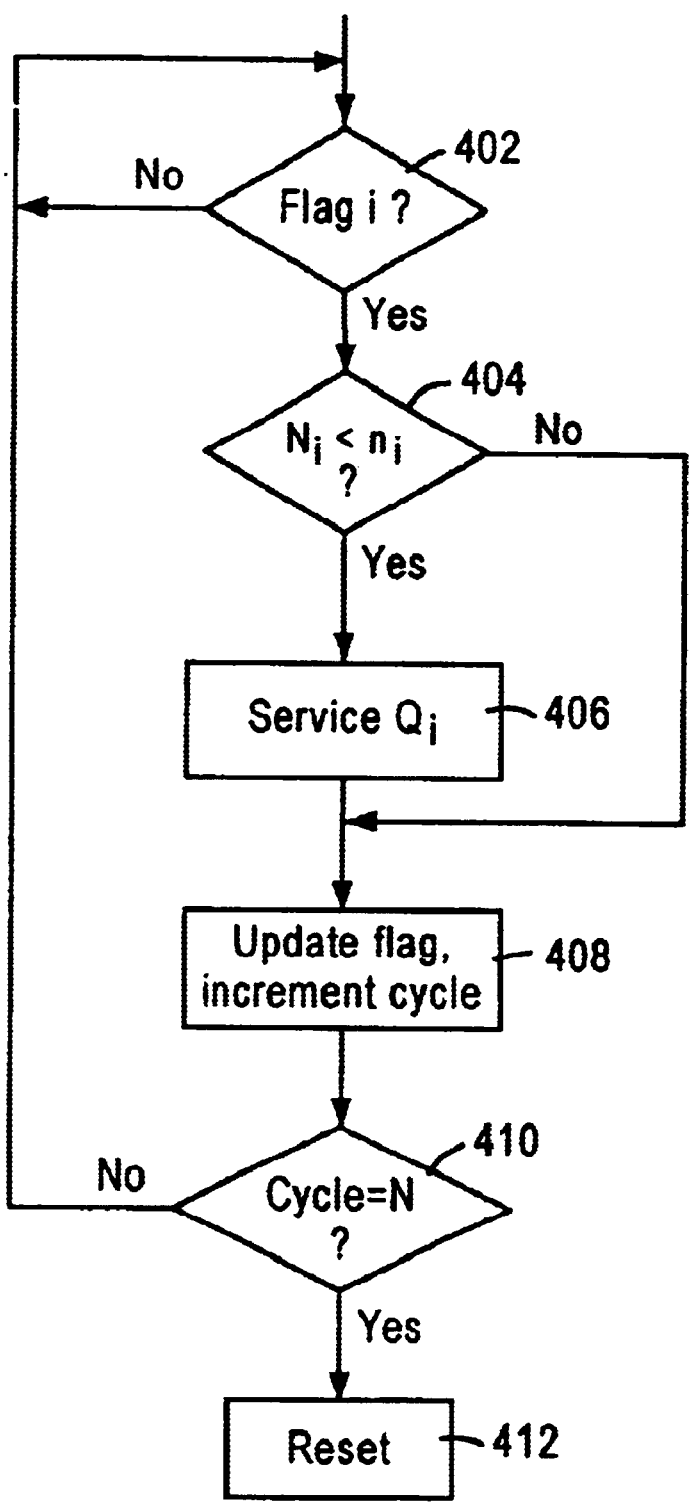
FIG. 4 is a flow chart illustrating a first preferred embodiment of the priority traffic service scheme of the present invention.

A first preferred embodiment of the present invention is illustrated using a flow chart in FIG. 4 showing an algorithm for servicing priority queues Q1, Q2, Q3 and Q4 in the dequeuing logic 76. The dequeuing logic 76 monitors a flag F indicating which one of the queues Q1 to Q4 is to be serviced. A flag Fi indicates that a queue Qi should be serviced, where i is an integral number between 1 and 4.

When the flag Fi is detected (block 402), the dequeuing logic 76 determines whether or not the number of packets Ni serviced from the queue Qi in a current cycle is less than a preprogrammed number ni of packets allocated to the queue Qi (block 404). If so, the dequeuing logic 76 services the queue Qi by transferring one packet from this queue to the output port for transmitting (block 406).

After servicing the queue Qi, the dequeuing logic 76 updates the flag F to indicate the next queue in a round-robin sequence. Also, a cycle number, which is the number of packets serviced in the current cycle, is incremented (block 408). Then, the cycle number is compared to the total number N of packets to be serviced in one cycle (block 410). If the cycle number is less than N, the dequeuing logic 76 goes to service the next queue pointed by the updated flag F. However, if the cycle number is equal to N, the dequeuing logic 76 resets the current cycle (block 412) and goes to the start of the next cycle.

If in block 404, the dequeuing logic 76 determines that the number of packets serviced from the queue Qi in the current cycle is not less then the preprogrammed number ni allocated for the queue Qi, the dequeuing logic 76 will not service the queue Qi. Instead, the flag F is updated, and the cycle number is incremented to service the next queue.

For example, if n1=4, n2=3, n3=2, and n4=1, the dequeuing logic 76 will service the queues Q1, Q2, Q3, and Q4 in each cycle in the following order: Q1, Q2, Q3, Q4, Q1, Q2, Q3, Q1, Q2, Q1, assuming that all the queues are always non-empty. If one of the queues has no packet to send, the flag is updated and the cycle number is incremented, and the algorithm moves to service the next queue pointed by the updated flag.

Thus, the worst-case maximum latency for the lowest priority queue is bounded. For the four priority queues Q1, Q2, Q3 and Q4, the maximum latency for a packet in the lowest-priority queue Q4 will be (n1+n2+n3+n4)*1518*t, where t is the service time for 1518 byte packet (a packet of the maximum length).

Accordingly, the first embodiment of the present invention uses the number of packets allocated to each queue as the only criterion to service each queue. However, this approach could result in unfair bandwidth allocation for a higher priority queue, if the higher priority queue consists of packets having smaller sizes than packets of a lower priority queue.

In addition to the number of packets to be serviced from each queue, bandwidth is used in a second preferred embodiment of the present invention as a criterion to service each queue. In accordance with the second embodiment of the present invention, the dequeuing logic 76 maintains for each queue a counter of number of data bytes transmitted during a specific interval. For example, this interval may be 1.2 ms for 100 Mbps operation, and 0.12 ms for 1000 Mbps operation. The counters are reset at the end of the specified interval.

Each queue is assigned with a programmable threshold value corresponding to the bandwidth allocated to the queue. For example, Q1, Q2, Q3 and Q4 may be assigned with 40%, 30%, 20% and 10% of total bandwidth, respectively.

Figure 5:
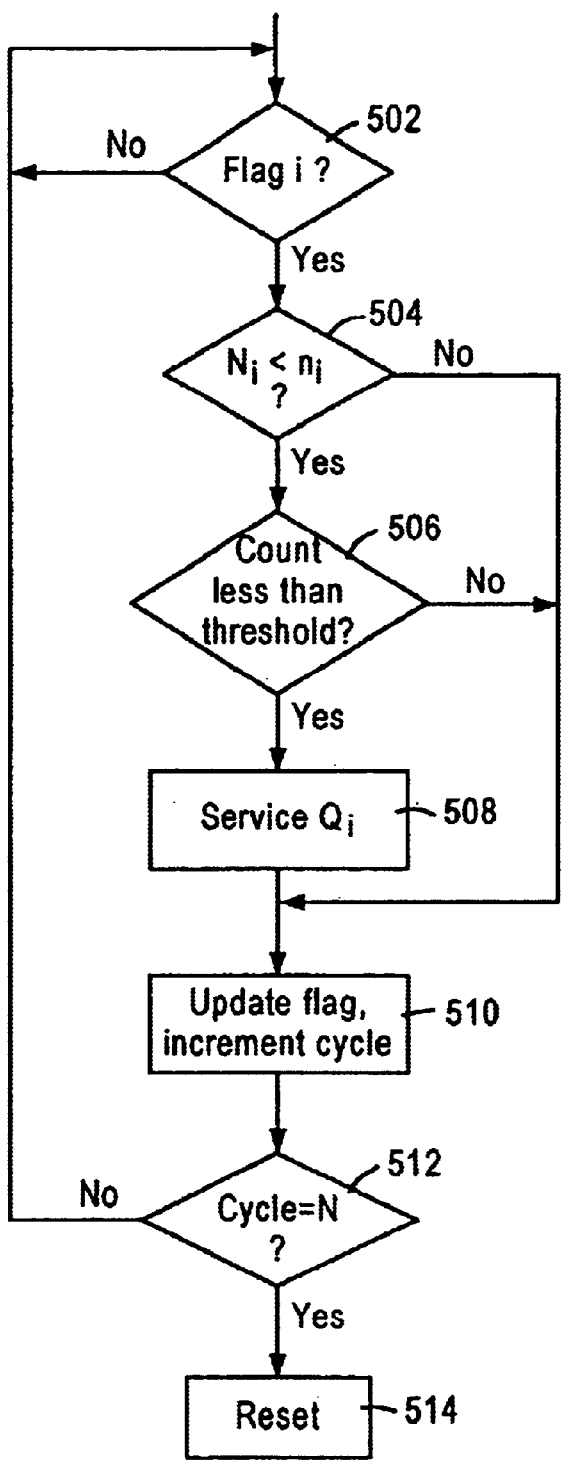
FIG. 5 is a flow chart illustrating a second preferred embodiment of the priority traffic service scheme of the present invention.

FIG. 5 illustrates the algorithm for servicing the queues in accordance with the second embodiment of the present invention. When the flag Fi indicates that a queue Qi should be serviced (block 502), the dequeuing logic 76 determines whether or not the number of packets Ni serviced from the queue Qi in a current cycle is less than a preprogrammed number ni of packets allocated to the queue Qi (block 504). If so, the dequeuing logic 76 checks the counter of number of bytes transmitted from the queue Qi during a specified interval (block 506). If the count of this counter is less than a preprogrammed threshold value corresponding to the bandwidth allocated to the queue Qi, the dequeuing logic 76 services queue Qi by transferring one packet from this queue to the corresponding output port for transmitting (block 508).

After servicing the queue Qi, the dequeuing logic 76 updates the flag F and increments a cycle number, which is the number of packets serviced in the current cycle (block 510). Then, the cycle number is compared to the total number N of packets to be serviced in one cycle (block 512). If the cycle number is less than N, the dequeuing logic 76 goes to service the next queue pointed by the updated flag F. However, if the cycle number is equal to N, the dequeuing logic 76 resets the current cycle (block 514) and goes to the start of the next cycle.

If in block 504 or 506, the dequeuing logic 76 determines that the number of packets serviced from the queue Qi in the current cycle is not less then the preprogrammed number ni allocated for the queue Qi, or the number of bytes transmitted from the queue Qi during the specified interval is not less than the threshold value, dequeuing logic 76 will not service the queue Qi. Instead, the flag F is updated, the cycle number is incremented, and the dequeuing logic 76 goes to service the next queue pointed by the updated flag. Also, if one of the queues has no packet to send, the flag is updated and the cycle number is incremented, and the algorithm moves to service the next queue pointed by the updated flag.

Thus, if the count of transmitted bytes for any queue is not less than the threshold value or any queue has no packets to send, the number of packets transmitted in a cycle may be less than N. For example, if n1=4, n2=3, n3=2, and n4=1, and the queue Q2 has no packet to send after it sent the first packet in a cycle, only 7 packets instead of 10 will be sent in this cycle. In this example, the dequeuing logic 76 will service the queues Q1, Q2, Q3, and Q4 in the following order: Q1, Q2, Q3, Q4, Q1, Q3, Q1,Q1.

Those skilled in the art will recognize that the present invention admits of a number of modifications, within the spirit and scope of the inventive concepts. Although the priority traffic service scheme was illustrated for four priority queues, any number of queues may be services in accordance with the present invention. Also, the priority traffic service scheme of the present invention may be implemented in the queuing logic 74. Alternatively, similar schemes for servicing priority queues may be implemented in the queuing logic 74 and the dequeuing logic 76.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method of servicing data queues having different priorities, comprising the steps of:
   preprogramming number of data packets to be selected from each data queue in each cycle of a servicing procedure,
   comparing number of data packets selected from a current data queue in a current cycle of the servicing procedure with the preprogrammed number of data packets set for the current queue,
   selecting a data packet from the current data queue, if the number of packets selected from the current data queue in the current cycle is less than the preprogrammed number, and
   bypassing the step of selecting a data packet from the current data queue, to process a next data queue, if the number of packets selected from the current data queue in the current cycle is not less than the preprogrammed number.

2. The method of claim 1, wherein the preprogrammed number of data packets is higher for a data queue having a higher priority.

3. The method of claim 1, wherein the total value of preprogrammed numbers of data packets to be selected in each cycle for all data queues is equal to a preprogrammed total number of data packets to be selected in each cycle.

4. The method of claim 3, further comprising the step of comparing whether total number of data packets selected in the current cycle is equal to the preprogrammed total number.

5. The method of claim 4, wherein the current cycle is reset if the total number of data packets selected in the current cycle is equal to the preprogrammed total number.

6. The method of claim 1, further comprising the step of counting number of bytes selected from each data queue in a preset time interval.

7. The method of claim 6, wherein each data queue is assigned with a threshold value corresponding to bandwidth allocated to the data queue.

8. The method of claim 7, further comprising the step of comparing the number of bytes selected from the current data queue in the preset time interval with the threshold value assigned to the current data queue.

9. The method of claim 8, wherein a data packet is selected from the current data queue, if the number of bytes selected from the current data queue in the preset time interval is less than the threshold value assigned to the current data queue.

10. The method of claim 9, wherein the step of selecting a data packet from the current data queue is bypassed to process the next data queue, if the number of bytes selected from the current data queue in the preset time interval is not less than the threshold value assigned to the current data queue.

11. A network switching system comprising:

ports for providing data communications between network stations, and a dequeuing circuit provided at each of the ports and responsive to data queues having different priorities for outputting data packets selected from the data queues, said dequeuing circuit comparing number of data packets selected from a current data queue in a current cycle of a data traffic servicing procedure with a preprogrammed number of data packets to be selected from the current data queue in each cycle of the data traffic servicing procedure, to select a data packet from the current data queue, if the number of packets selected from the current data queue in the current cycle is less than the preprogrammed number.

12. The system of claim 11, wherein the dequeuing circuit bypasses selection of a data packet from the current data queue, to process a next data queue, if the number of packets selected from the current data queue in the current cycle is not less than the preprogrammed number.

13. The system of claim 11, wherein the preprogrammed number of data packets corresponds to a priority of the current data queue.

14. The system of claim 11, wherein the dequeuing circuit further compares number of bytes selected from the current data queue in a preset time interval with a threshold value assigned to the current data queue.

15. The system of claim 14, wherein the dequeuing circuit selects a data packet from the current data queue, if the number of bytes selected from the current data queue in the preset time interval is less than the threshold value assigned to the current data queue.

16. The system of claim 15, wherein the dequeuing circuit bypasses selection of a data packet from the current data queue to process the next data queue, if the number of bytes selected from the current data queue in the preset time interval is not less than the threshold value assigned to the current data queue.

17. The system of claim 14, wherein the threshold value corresponds to bandwidth allocated to the current data queue.

* * * * *